(12) United States Patent
Keller, Jr. et al.

(10) Patent No.: US 8,446,931 B1
(45) Date of Patent: May 21, 2013

(54) CHIP TIMING SYNCHRONIZATION FOR LINK THAT TRANSITIONS BETWEEN CLEAR AND SPREAD MODES

(75) Inventors: Merle L. Keller, Jr., Salt Lake City, UT (US); Vaughn L. Mower, Bountiful, UT (US); Steve J. McEntire, Salt Lake City, UT (US); Kent R. Bruening, Sandy, UT (US)

(73) Assignee: L-3 Communications Corp, New York, NY (US)

( * ) Notice: Subject to any disclaimer, the term of this patent is extended or adjusted under 35 U.S.C. 154(b) by 296 days.

(21) Appl. No.: 13/089,833

(22) Filed: Apr. 19, 2011

(51) Int. Cl.
*H04B 1/00* (2006.01)
(52) U.S. Cl.
USPC ........... 375/145; 375/141; 375/140; 375/139; 375/130; 375/146; 375/147
(58) Field of Classification Search
USPC ................. 375/145, 141, 140, 139, 130, 146, 375/147
See application file for complete search history.

(56) References Cited

U.S. PATENT DOCUMENTS

| 4,638,494 | A | * | 1/1987 | Kartchner et al. | 375/367 |
|---|---|---|---|---|---|
| 7,054,350 | B2 | | 5/2006 | Keller et al. | |
| 7,065,127 | B2 | | 6/2006 | Keller et al. | |
| 7,190,711 | B2 | | 3/2007 | Keller et al. | |
| 7,200,233 | B1 | * | 4/2007 | Keller et al. | 380/268 |
| 7,230,974 | B1 | * | 6/2007 | Lu et al. | 375/145 |
| 7,471,716 | B2 | * | 12/2008 | Tamaki | 375/150 |
| 8,102,897 | B1 | * | 1/2012 | Mower et al. | 375/146 |
| 8,208,513 | B2 | * | 6/2012 | Amde et al. | 375/147 |
| 2001/0033606 | A1 | * | 10/2001 | Akopian et al. | 375/149 |
| 2001/0053699 | A1 | * | 12/2001 | McCrady et al. | 455/513 |

* cited by examiner

*Primary Examiner* — Kenneth Lam
(74) *Attorney, Agent, or Firm* — Kirton McConkie

(57) ABSTRACT

Synchronization of a primary link which transitions between clear mode and spread mode is achieved and maintained using a secondary link. When transitioning from clear mode to spread mode, a primary transmission delta phase is adjusted by the difference between a secondary reception delta phase and the primary transmission delta phase; and a primary reception delta phase is adjusted to be equal to a secondary transmission delta phase.

17 Claims, 4 Drawing Sheets

CHIP TIMING SYNCHRONIZATION FOR LINK THAT TRANSITIONS BETWEEN CLEAR AND SPREAD MODES

FIELD

The present application relates to wireless communications. More particularly, the present application relates to achieving and maintaining chip time synchronization for a link which can transition between a spread mode and a clear mode.

BACKGROUND

Spread spectrum techniques have proven useful in a variety of communications applications, including cellular telephones, wireless local area networks, and military communications. Spread spectrum techniques provide a number of advantages.

Wireless spread spectrum systems operate by using a relatively large amount of spectrum bandwidth to communicate their signals. The large bandwidth is consumed by spread spectrum encoding the message data using a pseudonoise code. The two most common types of spread spectrum transmission are frequency hopping, where the pseudonoise code is used to pseudo randomly change the transmission frequency on a periodic basis, and direct sequence, where the pseudonoise code is used to modulate the transmit signal at a high rate relative to the underlying message data.

In order to detect a spread spectrum transmission, it is generally necessary to know the pseudonoise code beforehand. Furthermore, to extract the message data, it is generally necessary to know the timing of the pseudonoise code. For example, in a direct sequence system, this can be accomplished by knowing the code frequency (rate at which the pseudonoise code advances through its code) and the starting time of the pseudonoise code (sometimes referred to as the phase of the code). A signal for which the spread spectrum receiver knows the pseudonoise code, pseudonoise code phase, and pseudonoise code frequency can be referred to as a synchronized signal.

Achieving synchronization with a spread spectrum signal can be difficult, in part due to high pseudonoise code rate (frequency). To accurately demodulate the spread spectrum signal, it is generally necessary to know the pseudonoise code phase within a fraction of a single chip of the pseudonoise code. Typically, performing initial acquisition of a spread spectrum signal is a time consuming process.

In some situations, it is desirable for a system to transition between operating in a spread spectrum mode and an unspread (clear) mode. Unfortunately, when transitioning from unspread mode back into spread mode, a re-acquisition is often necessary to reestablish synchronization of the pseudonoise code. Lengthy re-acquisition time may be undesirable.

SUMMARY

In some embodiments of the invention, a method of achieving chip timing synchronization between a primary platform and a secondary platform is provided. The method can include spreading the secondary link at the secondary platform using a secondary spreading code at a secondary transmission phase. The secondary transmission phase can include a secondary transmission delta phase that includes a secondary Doppler pre-compensation component for secondary platform movement. The method can include despreading the secondary link at the primary platform using the secondary spreading code at a secondary reception phase. The secondary reception phase can include a secondary reception delta phase. The method can also include tracking the secondary link using the secondary reception delta phase.

When operating the primary link in a spread mode, the method can include spreading the primary link at the primary platform using a primary spreading code at a primary transmission phase. The primary transmission phase can include a primary transmission delta phase that includes a primary Doppler pre-compensation component for primary platform movement. When operating the primary link in spread mode, the method can also include despreading the primary link at the secondary platform using the primary spreading code at a primary reception phase. The primary reception phase can include a primary reception delta phase. The method can also include tracking the primary link using the primary reception delta phase.

When transitioning the primary link from a clear mode to a spread mode, the method can include adjusting the primary transmission delta phase by the difference between the secondary reception delta phase and the primary transmission delta phase. The adjusting of the primary transmission delta phase can be done at the primary platform. When transitioning, the method can also include adjusting the primary reception delta phase to be equal to the secondary transmission delta phase. The adjusting of the primary reception delta phase can be done at the secondary platform.

In some embodiments of the invention, a primary platform is provided. The primary platform can include a modulator configured to transmit the primary link signal. The modulator can selectably transition between a spread mode and a clear mode. In the spread mode, the primary link can be spread using a primary pseudonoise stream. In the clear mode, the primary link can be unspread. The primary platform can also include a primary spreading code generator coupled to the modulator. The primary spreading code generator can provide the primary pseudonoise stream using a primary transmit code phase. A primary transmit code phase accumulator can be coupled to the primary spreading code generator. The primary transmit code phase can advance at a primary chip rate plus an adjustment by a primary transmit delta phase. The primary transmit delta phase can include a Doppler pre-compensation for movement of the primary platform.

The primary platform can also include a correlator configured to despread the secondary link using a secondary pseudonoise stream. The primary platform can also include a secondary spreading code generator coupled to the correlator. The secondary receive pseudonoise sequence generator can generate the secondary pseudonoise stream using a secondary receive code phase. A secondary receive code phase accumulator can provide the secondary receive code phase. The secondary receive code phase accumulator can advance the secondary receive code phase at a secondary chip rate plus an adjustment by a secondary receive delta phase. The secondary receive delta phase can be adjusted using a peak correlation time determined by the correlator. When the primary link transitions from the clear mode to the spread mode, the primary transmit code phase accumulator can adjust the primary transmit code phase by the difference between the primary transmit delta phase and the secondary receive delta phase when the primary link transitions from the clear mode to the spread mode.

In some embodiments of the invention, a secondary platform is provided. The secondary platform can include a modulator configured to transmit a secondary link spread spectrum signal using a secondary pseudonoise stream. The secondary platform can include a secondary spreading code generator coupled to the modulator. The secondary spreading code generator can generate the secondary pseudonoise stream using a secondary transmit code phase. A secondary transmit code phase accumulator can be coupled to the secondary spreading code generator, to provide the secondary transmit code phase. The secondary transmit code phase accumulator can advance the secondary code transmit code phase at a secondary chip rate plus an adjustment by a secondary transmit delta phase. The secondary transmit delta phase can include a Doppler pre-compensation for movement of the secondary platform.

The secondary platform can also include a correlator configured to despread the primary link using a primary pseudonoise stream. A primary spreading code generator can be coupled to the correlator to provide the primary pseudonoise stream. The primary spreading code generator can generate the primary pseudonoise stream using a primary receive code phase. A primary receive code phase accumulator can be coupled to the primary receive spreading code generator to provide the primary receive code phase. The primary receive code phase accumulator can advance the primary receive code phase at a primary chip rate plus an adjustment by a primary receive delta phase. When the primary link is in spread mode, the primary receive delta phase can be adjusted using a peak correlation time determined by the correlator. When the primary link transitions from the clear mode to the spread mode, the primary receive delta phase can be set equal to the secondary transmit delta phase.

In some embodiments of the invention, a communications system is provided. The communications system can include a primary platform as described above. The communications system can also include a secondary platform as described above.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
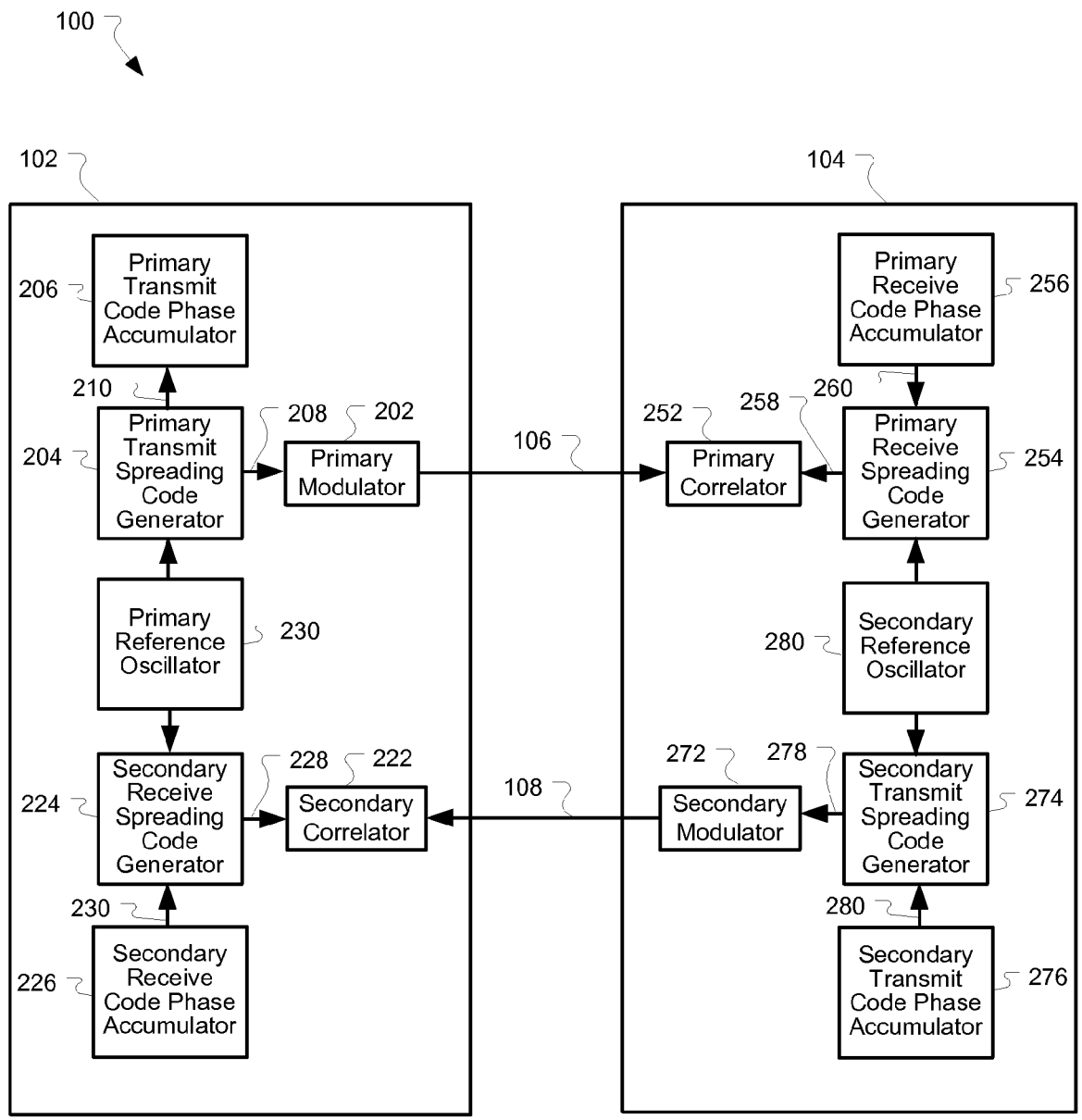
FIG. 1 is a block diagram of a communications system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Terminology

In describing the present invention, the following terminology will be used:

The singular forms "a," "an," and "the" include plural referents unless the context clearly dictates otherwise. Thus, for example, reference to a terminal includes reference to one or more terminals.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives or to only one of the listed alternatives at a time, unless the context clearly indicates otherwise.

Communications System

Turning to FIG. 1, a communication system is illustrated in accordance with some embodiments of the present invention. The system, shown generally at 100, can include a primary platform 102 and a secondary platform 104. Wireless links 106, 108 can be established between the primary platform and the secondary platform. For example, a primary link 106 can be transmitted from the primary platform and received at the secondary platform, and a secondary link 108 can be transmitted from the secondary platform and received at the primary platform. As discussed in further detail below, the primary link can operate in a spread mode and an unspread mode, and can transition back and forth between the spread and unspread mode. The secondary link can also operate in a spread mode.

Primary Link

Figure 2:
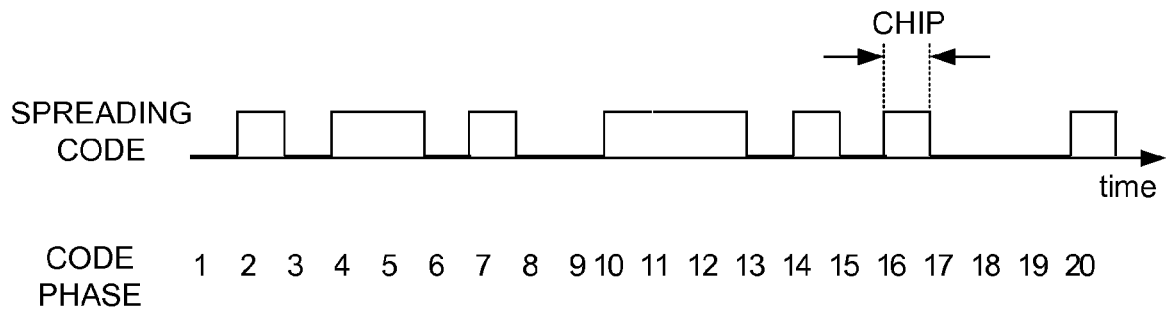
FIG. 2 is a diagram of a pseudonoise stream and associated code phase in accordance with some embodiments of the present invention.

Turning to the primary link 106 in further detail, in some embodiments, the primary platform 102 and secondary platform 104 can include various components to allow establishment of the primary link. The primary platform can include a transmit subsystem which includes a primary modulator 202, primary transmit spreading code generator 204, and primary transmit code phase accumulator 206. The primary modulator can transmit the primary link signal 106, which can be a spread mode signal or a clear mode signal. For example, the primary modulator can be configured to selectably transition between spread mode and clear mode. For example, transitions can be initiated by manual (operator) control or automatic control (e.g., driven by network management/control software running on the primary platform). In clear mode, communication data can be transmitted by the primary modulator in an unspread format. For example, communication data can be encoded into a wireless signal using various formats including by way of example and not limitation: phase modulation, frequency modulation, amplitude modulation, and combinations thereof. In spread mode, communication data can be transmitted by the primary modulator in a spread format. Communication data can be encoded and spread. For example, spreading can be performed using frequency hopping, time hopping, phase hopping, and combinations thereof. As a particular example, spreading can be direct sequence spreading using a primary transmit spreading code 208 (which can, for example, be a pseudonoise stream). The primary transmit spreading code can be generated by the primary transmit spreading code generator. The primary transmit spreading code can have a primary transmit code phase 210. For example, the primary transmit code phase can be maintained in units of primary transmit code chips. FIG. 2 illustrates an example of a spreading code and associated code phase as a function of time in accordance with some embodiments of the present invention. The code phase can, for example, start at one with the first chip of the pseudonoise, and advance by one with each new chip of the spreading code. The code phase can advance at a rate equal to the chip rate of the code. Of course, other units for the primary transmit code phase can be used, including for example, a count of a clock (not shown) within the primary platform.

The primary transmit code phase accumulator 206 can maintain the primary transmit code phase 210. The primary transmit code phase can advance at the primary chip rate, and can include an adjustment by a primary transmit delta phase. For example, the primary transmit code phase can advance at a nominal rate derived from a reference oscillator 230 on the primary platform. The primary transmit delta phase can include a correction or adjustment to account for Doppler effects. In some embodiments, the primary transmit delta phase can include a Doppler pre-compensation for movement of the primary platform. For example, the primary transmit delta phase can be regularly increased or decreased by an amount corresponding to a range change of the primary link. As a particular example, the primary transmit delta phase can be adjusted to compensate for motion of the primary platform relative to the secondary platform. The adjustment can compensate for the movement of the primary platform relative to inertial space (e.g., relative to a stationary position in a desired frame of reference). For example, if the primary platform has moved 100 meters in the direction toward the secondary platform, this corresponds to a range delay difference of 0.33 microseconds. Accordingly, the primary transmit delta phase can be reduced (retarded or delayed) by 0.33 microsecond to compensate for the shortened range. For this example, when using a chipping rate of 100 mega-chips-per-second, the primary transmit phase be reduced by 33.3 chips. Range information can be obtained using navigational systems on the primary platform, secondary platform, or both. For example, locations of the primary platform and secondary platform can be obtained from a Global Positioning System (GPS) receiver (not shown) provided on each platform, and the locations can be processed to determine range and range rate information. As another example, Doppler pre-compensation at the primary platform can account for all relative movement of the primary platform relative to the secondary platform (in which case the secondary platform need not perform any Doppler compensation).

The secondary platform 104 can include a receive subsystem which includes a primary correlator 252, primary receive spreading code generator 254, and primary receive code phase accumulator 256. The primary correlator can despread the primary link signal 106, using a primary receive spreading code 258, which can be generated by the primary receive spreading code generator. The primary receive spreading code can have a primary receive code phase 260.

The primary receive code phase accumulator 256 can maintain the primary receive code phase 260. The primary receive code phase can advance at the primary chip rate, and can include an adjustment by a primary receive delta phase. For example, the primary receive code phase can advance at a nominal rate derived from a reference oscillator 280 on the secondary platform. The primary receive delta phase can include a correction or adjustment based on timing errors detected within the primary correlator. The correlator can perform determine if a peak correlation time is different than a nominal time at which the correlation is expected, for example by performing correlations at times advanced or retarded from a nominal time. Adjustments to the primary receive delta phase can be made to bring the primary receive code phase into better alignment with the received primary signal.

The primary receive delta phase can also include a correction or adjustment to account for Doppler effects in a similar manner as described above for the primary transmit delta phase. In some embodiments, the primary receive delta phase can include a Doppler pre-compensation for movement of the secondary platform. For example, the primary receive delta phase can be adjusted to compensate for motion of the secondary platform relative to the primary platform. The adjustment can compensate for the movement of the secondary platform relative to inertial space in a similar manner as described above.

Various ways of achieving initial synchronization of the primary link 106 can be used. For example, in some embodiments, the primary transmit code phase 210, primary transmit delta phase, primary receive code phase 260, and primary receive delta phase can all be initialized to zero. This will not necessary ensure that the primary link is synchronized, however, due to differences in the initialization time of the primary platform 102 and secondary platform 104, range delay (or errors in estimated range delay) between the primary platform and the secondary platform, or other factors. Accordingly, the primary correlator 252 can perform a search for the primary link. For example, the search can be performed by performing correlations at times advanced and retarded from the nominal primary receive code phase. For example, the search can cover time offsets corresponding to possible variations in the initialization time, range delay, and other factors. Once the primary link signal has been detected by the primary correlator at a particular time offset, the time offset can be included in the primary receive delta phase. When using composite codes, partial code correlation can also be used.

Once initial synchronization of the primary link 106 has been achieved, synchronization on the primary link can be maintained by several factors. As discussed above, the primary transmit code phase 210 can include primary transmit delta phase which compensates for primary platform Doppler. The primary receive code phase 260 can include primary receive delta phase which compensates for secondary platform Doppler. Residual phase error or drift can be detected by the primary receive correlator 252 (e.g., caused by errors or uncertainty in the Doppler estimates of the primary platform and/or secondary platform, or relative clock drift between the primary platform and the secondary platform). Residual phase error or drift can be compensated by additional adjustments to the primary receive delta phase. For example, the primary receive delta phase can accumulate phase (positive or negative) corresponding to clock drift due to clock disagreement between the primary platform and secondary platform. For example, if there is a $10^{-7}$ (0.1 part per million) difference in the reference oscillators 230, 280, this additional delta phase term will increase (or decrease) by 0.1 microseconds each second.

Secondary Link

Turning to the secondary link 108 in further detail, in some embodiments, the primary platform 102 and the secondary platform 104 can include various components to allow establishment of the secondary link. The secondary platform can include a transmit subsystem which includes a secondary modulator 272, a secondary transmit spreading code generator 274 and a secondary transmit code phase accumulator 276. The secondary modulator can transmit the secondary link signal, which can be a spread mode signal. For example, spreading can be performed using frequency hopping, time hopping, phase hopping, and combinations thereof. As a particular example, spreading can be direct sequence spreading using a secondary transmit spreading code 278. The secondary transmit spreading code can be generated by the secondary transmit spreading code generator. The secondary transmit spreading code can have a secondary transmit code phase 280. For example, the secondary transmit code phase can be maintained in units of secondary transmit code chips. The secondary transmit code phase accumulator can maintain the secondary transmit code phase 260. The secondary transmit code phase can advance at the secondary chip rate, and can include an adjustment by a secondary transmit delta phase. For example, the secondary transmit delta phase can be a correction or adjustment to account for Doppler effects. In some embodiments, the secondary transmit delta phase can include a Doppler pre-compensation for movement of the secondary platform. The Doppler pre-compensation on the secondary link can operate similarly as described above for the primary link, with the secondary platform adjusting for its own motion relative to inertial space (and the primary platform adjusting for its own motion relative to inertial space for the secondary link as well).

The primary platform 102 can include a receive subsystem which includes a secondary correlator 222, secondary receive spreading code generator 224, and secondary receive code phase accumulator 226. The secondary correlator can despread the secondary link signal 108, using a secondary receive spreading code 228, which can be generated by the secondary receive spreading code generator. The secondary receive spreading code can have a secondary receive code phase 230. The secondary receive code phase accumulator 226 can maintain the secondary receive code phase. The secondary receive code phase can advance at the secondary chip rate, and can include an adjustment by a secondary receive delta phase. For example, the secondary receive delta phase can be a correction or adjustment based on timing errors detected within the secondary correlator. For example, the secondary receive delta phase can be a correction or adjustment based on timing errors detected within the secondary correlator. The correlator can determine if a peak correlation time is different than a nominal time at which the correlation is expected, for example by performing correlations at times advanced or retarded from a nominal time. Adjustments to the secondary receive delta phase can be made to bring the secondary receive code phase into better alignment with the received primary signal. The secondary receive delta phase can include a correction or adjustment to account for Doppler effects as described above.

Initial acquisition and tracking on the secondary link 108 can operate in a similar manner as the primary link, with each platform performing Doppler pre-compensation for its own motion, the secondary receive correlator 222 performing initial acquisition searching and tracking, and adjustments to the secondary receive delta phase being made.

Phase Accumulators

Figure 3:
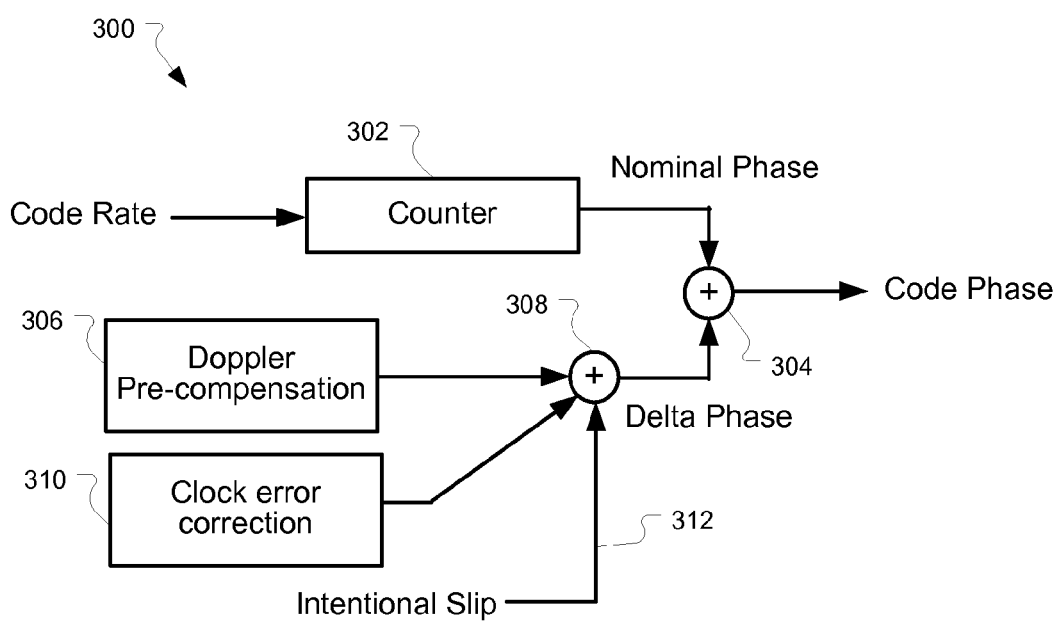
FIG. 3 is a block diagram of a phase accumulator in accordance with some embodiments of the present invention

FIG. 3 illustrates on example of an implementation of a phase accumulator 300, which can be used as any of the primary transmit code phase accumulator 206, primary receive code phase accumulator 256, secondary transmit code phase accumulator 276, and secondary receive code phase accumulator 226.

The phase accumulator 300 can include a counter 302. The counter can accept as input a code rate. For example, the counter can operate at a reference clock rate, and the code rate can be specified as a number of samples per chip, so that the counter advances by 1 for each chip. The output of the counter can thus correspond to a nominal phase. A summer 304 can add a delta phase to the nominal phase to obtain the code phase that is output from the phase accumulator.

The delta phase can be determined, at least in part, by a Doppler pre-compensation module 306. For example, the Doppler pre-compensation can be determined by taking location and velocity information for the primary and secondary platform and determining relative movement of the primary and secondary platform. The delta phase can also include other adjustments, including for example clock error correction 310, and intentional slips 312, which can be added into the delta phase by a summer 308. The clock error correction can, for example, correspond to a correlation time offset determined by a receive correlator. The intentional slip can, for example, correspond to adjustments to the delta phase when the primary link is transitioning as described in further detail below.

Primary Link Transitions

As mentioned above, the primary link 106 can transition between spread mode and clear mode. When the primary link transitions from spread mode into clear mode, the primary receive correlator 252 will no longer obtain information related to tracking the primary pseudonoise code. The primary receive code phase accumulator 256 can continue to advance the primary receive code phase 260 at the nominal primary chip rate, but may begin to drift relative to the primary transmit code phase 210 (e.g., due to errors in range and/or reference oscillator disagreement). Accordingly, when the primary link transitions back from clear mode to spread mode, the primary receive code phase may no longer be synchronized with the primary transmit code phase. This can necessitate performing a full initial acquisition search (e.g., over range and clock uncertainty windows). This may be undesirable, as the initial acquisition search can sometimes take more time than desired.

In some embodiments, performing an initial acquisition search can be avoided when the primary link 106 transitions from clear mode to spread mode by making appropriate adjustments in the primary transmit delta phase and primary receive delta phase. Because the secondary link 108 continues operating in spread mode while the primary link 106 is in clear mode, it is possible to maintain synchronization as will now be explained. As described above, the primary platform 102 and the secondary platform can 106 can each perform Doppler pre-compensation (compensating for their own movement relative to inertial space). Accordingly, when both the secondary link and the primary link are operating in spread mode and synchronized, the adjustments to delta phase (beyond the Doppler pre-compensation) can be primarily due to clock drift due to reference oscillator 230, 280 disagreement between the platforms. In particular, the primary receive delta phase can include adjustments to compensate for drift of the primary platform relative to the timing of the secondary platform (measured by the primary correlator 252). Conversely, the secondary receive delta phase can include adjustments to compensate for drift of the secondary platform relative to the timing of the primary platform (measured by the secondary correlator). Thus, the adjustments on both platforms can be substantially equal (in units of time) but opposite directions. The adjustments may not be exactly equal due to noise and other minor errors and uncertainty. Thus, as long as either one of the primary link or the secondary link is operating in spread mode and synchronized, enough information is available to allow the other link to be rapidly re-synchronized as will be described in further detail below.

Thus, in some embodiments, when the primary link transitions from clear mode back to spread mode, various adjustments can be made to the delta phases to rapidly reestablish synchronization. For example, the primary transmit code phase accumulator 206 can adjust the primary transmit delta phase by the difference between the primary transmit delta phase and the secondary receive delta phase. The primary receive code phase accumulator 260 can set the primary receive delta phase equal to the secondary transmit delta phase. The net effect of this can be to cause the primary link to be synchronized or close to synchronization. For example, small errors may remain due to errors in the Doppler pre-compensation. Accordingly, if desired, a reacquisition can be performed. The reacquisition can operate similarly to initial acquisition by searching different offset times with the primary receive correlator 252. The reacquisition time can be considerably shorter because the offset times to be searched can be greatly reduced as compared to initial acquisition. For example, since clock error disagreement is substantially eliminated, and Doppler pre-compensation is maintained, the search window can correspond to a small amount of Doppler estimation error, clock drift error, or combination of both.

Analysis

The following mathematical derivation provides further insight into the disclosed techniques for achieving and maintaining chip synchronization between the primary platform and the secondary platform. At initialization time, the code phase accumulators on a platform (e.g., 206, 226; 256, 276) can be initialized at substantially same time. Of course, due to hardware limitations, the initialization may not be simultaneous, but may differ by a few chips of the pseudonoise sequences. The code phases can progress at nominal rates (e.g., primary chip rate and secondary chip rate, as appropriate), derived from the reference oscillator 230, 280 on each platform. However, the modulators 202, 272 can include Doppler pre-compensation. For example, the modulator can slow the chipping rate based on the rate of travel towards the opposing platform and can increase the chipping rate based on the rate of travel away from the opposing platform. This faster or slower chipping rate of generation accumulates delta phase greater than or less than would occur at the nominal rate of generation, respectively. Delta phase can thus refer to code phase that is accumulated faster or slower than the nominal progression of a code sequence. Intentional phase adjustments can also be included in delta phase. In addition to Doppler accumulated phase, the correlators 222, 252 can also determine additional delta phase due to clock disagreement between the platforms.

The modulator and correlator of each of two communicating platforms can each have their own code phase, meaning that at a given time, each has progressed a certain number of chips. The code phases of each modulator and correlator (the four code phases of a full duplex system) can be given by:

$$\theta_{p\text{-}mod} = t_p R_p + \Delta\theta_{p\text{-}mod}$$

$$\theta_{s\text{-}mod} = t_s R_s + \Delta\theta_{s\text{-}mod}$$

$$\theta_{p\text{-}corr} = t_s R_p + \Delta\theta_{p\text{-}corr}$$

$$\theta_{s\text{-}corr} = t_p R_s + \Delta\theta_{s\text{-}corr} \quad (1)$$

where θ is the code phase, Δθ is the delta phase, t is time, R is the code rate, and subscript p refers to primary, s refers to secondary, mod refers to the modulators, and corr refers to the correlators. In other words, the code phase of the modulators is the amount of time that has passed (for its corresponding platform) multiplied by the chip rate, plus the delta phase. While equation set (1) above shows time converted to chips by simply multiplying by chip rate, it will be appreciated that phase can be expressed in various units and various way of converting can be used. For example, chip phase can be expressed in chips, fractions of chips, or any other convenient unit. In some embodiments, chip phase can be expressed in a count of clock samples of the reference clock, for which chip phase can be scaled to different rates by dividing or multiplying by a number of clock samples per chip. In some embodiments, chip phase can be expressed as a count of chips, and can be obtained by dividing a clock cycle count by a number of samples per chip.

The modulators and correlators of each platform can share the same time. That is, the primary transmit spreading code generator 204 and secondary receive spreading code generator 224 can share the same time ($t_p$) since they are driven by reference oscillator 230. Similarly, primary receive spreading code generator 254 and secondary transmit spreading code generator 274 can share the same time ($t_s$). Therefore, solving equation set (1) for time, and setting expressions with the same time equal to each other results in two expressions relating the code phases of the modulators and the correlators:

$$\theta_{p-mod} = (\theta_{s-corr} - \Delta\theta_{s-corr})\frac{R_p}{R_s} + \Delta\theta_{p-mod} \quad (2)$$

$$\theta_{p-corr} = (\theta_{s-mod} - \Delta\theta_{s-mod})\frac{R_p}{R_s} + \Delta\theta_{p-corr}$$

Equation set (2) says that the code phase of the primary modulator (on the primary platform) is equal to the difference between the secondary correlator (on the primary platform) code phase and delta phase (converted from secondary chips to primary chips) plus the delta phase of the primary platform modulator. Similarly, the code phase of the primary correlator (on the secondary platform) is equal to the difference between the secondary modulator (on the secondary platform) code phase and delta phase (converted from secondary chips to primary chips) plus the delta phase of the primary correlator.

If the code phase of the primary modulator were intentionally slipped by just the right number of chips ($\Delta\theta_{p-mod-adj}$), the code phase of the primary modulator can be made to arrive at (or nearly at) the zero phase of the primary correlator (at the secondary platform).

Mathematically, $$\theta_{p-mod} + \Delta\theta_{p-mod-adj} = \theta_{p-corr} + \frac{R_p}{c}\text{Range} \quad (3)$$

In other words, the phase of the primary modulator plus the intentional slip $\Delta\theta_{p-mod-adj}$ will set the transmitted code phase equal to the code phase of the primary correlator after the signal has travelled the range between the platforms (here, the range expressed as a distance is divided by the speed of light c, and multiplied by the primary chip rate $R_p$, to convert it into primary link chips).

From the above, we can see that, when the secondary link is locked, the code phase of the secondary modulator is equal to the code phase of the primary correlator plus the number of chips strung out between the platforms, that is:

$$\theta_{s-mod} = \theta_{s-corr} + \frac{R_s}{c}\text{Range} \quad (4)$$

We can solve for the intentional slip necessary by solving equation (3) and substituting in equations (2) and (4) to yield:

$$\Delta\theta_{p-mod-adj} = \quad (5)$$
$$\Delta\theta_{p-corr} - \Delta\theta_{s-mod}\frac{R_p}{R_s} + \Delta\theta_{s-corr}\frac{R_p}{R_s} - \Delta\theta_{p-mod} + 2\frac{R_p}{c}\text{Range}$$

Equation (5) says that the intentional code slip to be effected to the primary modulator is equal to the primary correlator delta phase minus the secondary modulator delta phase (converted from secondary chips to primary chips), plus the secondary correlator delta phase (converted from secondary chips to primary chips), minus the primary modulator delta phase, plus twice the range (in primary link chips).

To apply equation (5) the primary platform uses all four delta phases. But, this entails communicating phase information from the secondary platform to the primary platform.

Instead, by setting the primary correlator delta phase (at the secondary platform) equal to the secondary modulator delta phase (also available at the secondary platform), accounting for chip rate differences, the primary platform no longer needs delta phase information from the secondary platform, and equation (5) can be reduced to:

$$\Delta\theta_{p-mod-adj} = \Delta\theta_{s-corr}\frac{R_p}{R_s} - \Delta\theta_{p-mod} + 2\frac{R_p}{c}\text{Range} \quad (6)$$

Thus, in some embodiments, the primary platform can adjust primary modulator phase according to equation (6).

The secondary platform can thus determine an adjustment for correlator phase by calculating:

$$\Delta\theta_{p-corr-adj} = \Delta\theta_{s-mod}\frac{R_p}{R_s} - \Delta\theta_{p-corr} \quad (7)$$

and applying the adjustment:

$$\Delta\theta_{p-corr}(\text{new}) = \Delta\theta_{p-corr}(\text{old}) + \Delta\theta_{p-corr-adj} \quad (8)$$

Thus, in some embodiments, the secondary platform can adjust primary correlator phase according to equations (7) and (8).

It should be noted that equations (6), (7) and (8) can manipulate non-zero delta phases. Since the modulators and correlators are allowed to have non-zero delta phases, this can allow for Doppler pre-compensation and clock disagreement delta phase accumulation to be retained. Thus, even when the primary link has operated in clear mode for a lengthy period of time, the continued tracking of Doppler pre-compensation and clock disagreement provided by the secondary link can enable rapid reestablishment of synchronization on the primary link when returning to spread mode. It is only necessary for the secondary platform to make the adjustments once for each transition from clear mode to spread mode.

Moreover, because Doppler pre-compensation is maintained by each platform 102, 104, even when there is a temporary outage in the secondary link 108, rapid reacquisition of the primary link 106 can still be achieved. This is because the delta phases contain information related to both the accumulated Doppler and accumulated clock disagreement, and only a small amount of drift occurs during the temporary outage. Thus, the difference between the secondary reception delta phase and the primary transmission delta phase can consist mainly of accumulated clock drift between the primary platform and the secondary platform. Thus, by adjusting the primary transmission delta phase by this difference, the accumulated clock drift caused by reference oscillator disagreement between the platforms can be essentially zeroed. Since the Doppler is continuously being pre-compensated, this has the nominal effect of forcing the primary link into synchronization. As noted above, some small amount of residual clock drift or errors in Doppler may remain, which can be accommodated by using a small re-acquisition search window during rapid reacquisition of the primary link at the secondary platform.

Coordinating Transitions

Figure 4:
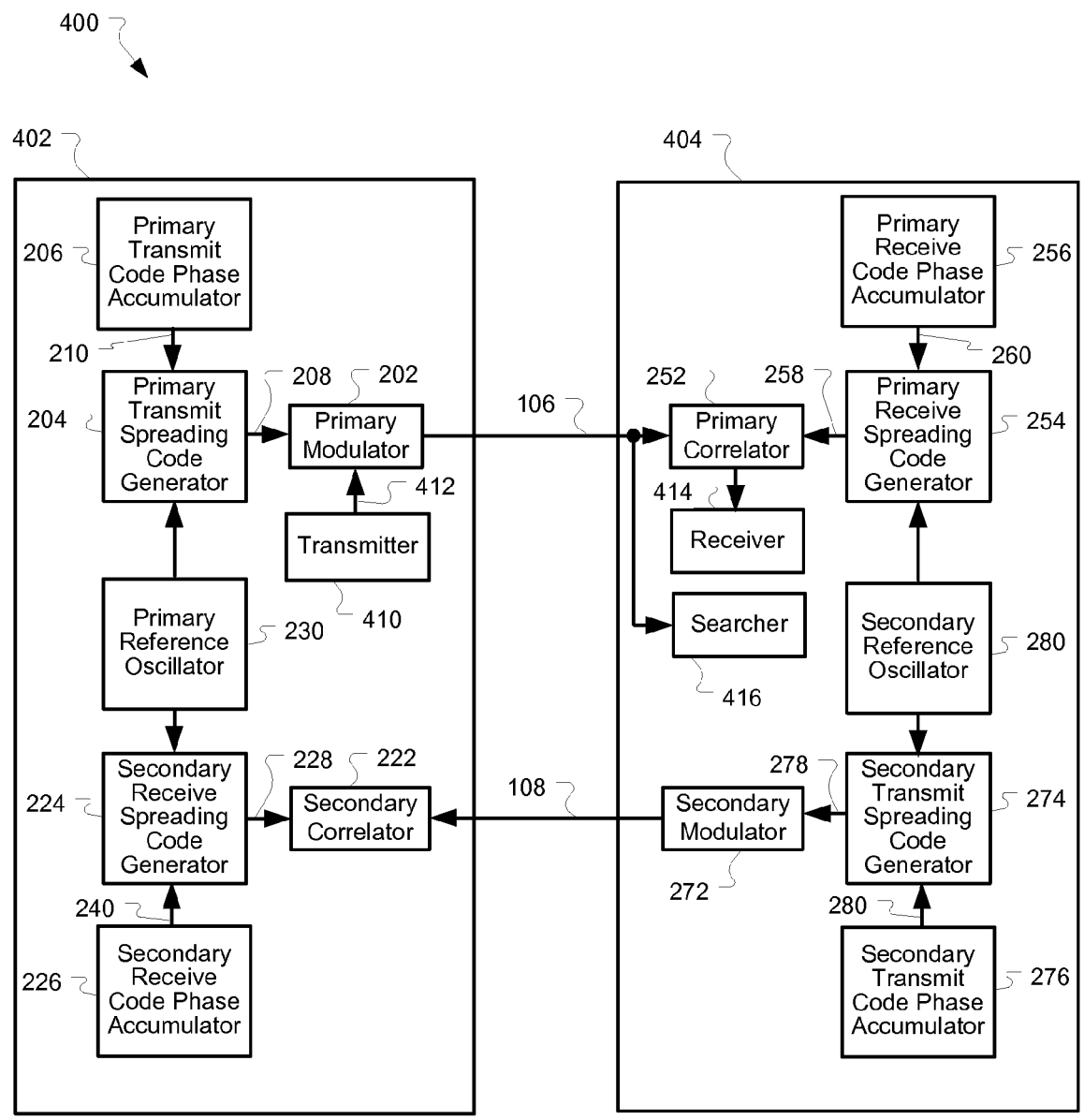
FIG. 4 is a block diagram of another communications system in accordance with some embodiments of the present invention.

Turning to FIG. 4, another example of a communication system is illustrated in accordance with some embodiments of the present invention. The system 400 can include a primary platform 402 and a secondary platform 404. The primary platform and secondary platform can include generally similar components as for the system of FIG. 1, and thus similar components are numbered similarly. In addition, the primary platform 402 can include a transmitter 410 coupled to the primary modulator 202. The transmitter can provide data 412 to the primary modulator which can be encoded into the primary link signal for transmission on the primary link. The data can include data provided to the terminal from external systems, data generated within the terminal, and commands. For example, the data can comprise a command to indicate that a transition between clear mode and spread mode is going to occur. For example, the data can specify that a transition is going to occur at a predefined time in the future (e.g., determined by a predefined time delay, predefined bit count, or other suitable measure). The data can specify the type of transition (e.g., clear mode to spread mode or spread mode to clear mode). The data can simply specify that a transition is to occur, the type of transition being inferred from the current mode.

The secondary platform 404 can include a receiver 414. The receiver can be coupled to the primary correlator 252 to receive the data sent by the transmitter 410. For example, the receiver can receive the command indicating that a transition between clear mode and spread mode is going to occur. The received command can be used to reconfigure the primary correlator and receiver as needed. The received command can also be used to initiate operations that adjust the delta phases within the secondary platform as described above.

The secondary platform 404 can also include a searcher 416. The searcher can search for the primary link over a set of primary receive spreading delta phases. For example, the set can correspond to an uncertainty window. The uncertainty window can include any or all of: a Doppler uncertainty amount, a clock disagreement amount, and an initial start time uncertainty amount. Although shown separately, the searcher 416 can be implemented using the primary correlator 252.

If desired, the secondary platform can also include a transmitter (not shown) to transmit data in a similar manner to the primary platform. Similarly, if desired, the primary platform can include a receiver (not shown) and searcher (not shown).

Operation

Figure 5:
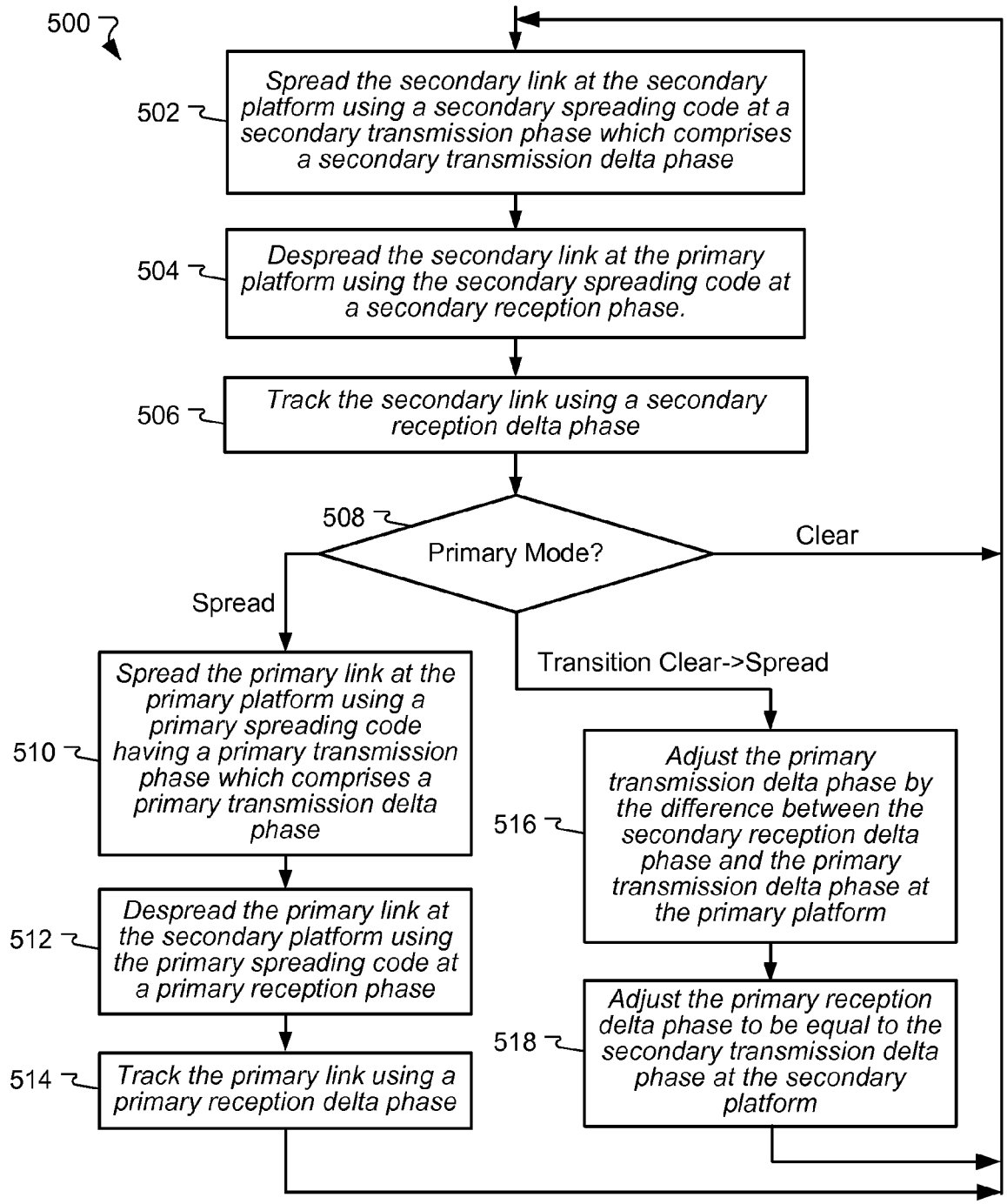
FIG. 5 is a flow chart of a method of achieving chip timing synchronization between a primary platform and a secondary platform in accordance with some embodiments of the present invention.

FIG. 5 illustrates a method of achieving chip timing synchronization between a primary platform and a secondary platform. The primary platform can transmit a primary link which is received at the secondary platform. The primary link can transition between a clear mode and a spread mode. The secondary platform can transmit a secondary link which is received at the primary platform. The secondary link can be spread.

The method 500 can include the operations at 502, 506, 508 which can establish the secondary link. This can include, at 502, spreading the secondary link at the secondary platform using a secondary spreading code at a secondary transmission phase. The secondary transmission phase can include a secondary transmission delta phase. The secondary transmission delta phase can include a secondary Doppler pre-compensation component for secondary platform movement, for example as described above. This can also include, at 504, despreading the secondary link at the primary platform using the secondary spreading code at a secondary reception phase and, at 506, tracking the secondary link using a secondary reception delta phase. For example, the tracking can adjust the secondary reception delta phase based on where a correlation peak is detected.

Additional operations in the method can be selected, at 508, depending on the mode the primary link is operating in. For example, when the primary link is operating in spread mode, operations at 510, 512 and 514 can be performed. When the primary link transitions from clear mode to spread mode, operations at 516, 518 can be performed.

Thus, when operating in spread mode, the method 500 can include, at 510, spreading the primary link at the primary platform using a primary spreading code at a primary transmission phase. The primary transmission phase can include a primary transmission delta phase. The primary transmission delta phase can include a primary Doppler pre-compensation component for primary platform movement, for example as described above. Operating in spread mode can also include, at 512, despreading the primary link at the secondary platform using the primary spreading code at a primary reception phase, and, at 514, tracking the primary link using a primary reception delta phase. The primary reception delta phase can include a Doppler pre-compensation component for primary platform movement, for example as described above.

When transitioning from clear mode to spread mode, the method 500 can include, at 516, adjusting the primary transmission delta phase by the difference between the secondary reception delta phase and the primary transmission delta phase at the primary platform. At 518, the secondary platform can adjust the primary reception delta phase to be equal to the secondary transmission delta phase.

If desired, when transitioning from clear mode to spread mode, the method 500 can include transmitting an indicator on the primary link. The indicator can indicate that the primary link is switching from the clear mode to the spread mode. The indicator can be transmitted before switching the primary link from clear mode to spread mode.

If desired, when transitioning from clear mode to spread mode, the method 500 can include performing a rapid reacquisition at the secondary platform to reacquire the primary link in the spread mode after the primary link has switching from clear mode to spread mode.

While the discussion above has made reference to a clear mode and a spread mode, it will be appreciated that multiple differing spread and clear modes can be provided. For example, differing spread modes can use different chipping rates, different transmission data rates, or combinations of both. Similarly, differing clear modes can use different transmission data rates.

It will also be appreciated that various types of spreading codes can be used. For example, the spreading codes can be pseudonoise codes. The pseudonoise codes can be binary, multi-valued, complex (real part plus imaginary part; inphase and quadrature components, etc.), or other desired formats. In some embodiments, the codes can be composite codes formed from a plurality of shorter component codes. For example, composite codes can be formed by logically combining two or more shorter component codes of differing lengths.

It will be appreciated that the platforms can include additional conventional components used for transmitting and receiving wireless signals, including for example: synthesizers, mixers, amplifiers, filters, upconverters, downconverters, demodulators, modulators, encoders, decoders, interleavers, deinterleavers, antennas, and the like. Various ways of implementing the spreading code generators can be used, including for example, linear feedback shift registers and other techniques. The code phase accumulators can be implemented in digital hardware (e.g., discrete logic, field programmable gate array, or application specific integrated circuits). Digital logic can be used to perform the various mathematical operations disclosed herein. Alternatively, or in addition, a microprocessor or microcontroller can perform some or all of the operations, including for example, storing code phase, storing delta phase, advancing code phase, subtracting, multiplying, and the like.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

What is claimed is:

1. A method of achieving chip timing synchronization between a primary platform and a secondary platform, wherein a primary link is transmitted from the primary platform and is received at the secondary platform, and a secondary link is transmitted from the secondary platform and is received at the primary platform, and the primary link can transition between a clear mode and a spread mode, the method comprising:

spreading the secondary link at the secondary platform using a secondary spreading code at a secondary transmission phase which comprises a secondary transmission delta phase, wherein the secondary transmission delta phase comprises a secondary Doppler pre-compensation component for secondary platform movement;

despreading the secondary link at the primary platform using the secondary spreading code at a secondary reception phase;

tracking the secondary link using a secondary reception delta phase;

when operating the primary link in a spread mode:

spreading the primary link at the primary platform using a primary spreading code at a primary transmission phase which comprises a primary transmission delta phase, wherein the primary transmission delta phase comprises a primary Doppler pre-compensation component for primary platform movement, and despreading the primary link at the secondary platform using the primary spreading code at a primary reception phase, and tracking the primary link using a primary reception delta phase; and when transitioning the primary link from the clear mode to the spread mode:

adjusting the primary transmission delta phase by the difference between the secondary reception delta phase and the primary transmission delta phase at the primary platform; and adjusting the primary reception delta phase to be equal to the secondary transmission delta phase at the secondary platform.

2. The method of claim 1, further comprising: transmitting on the primary link an indicator that the primary link is switching from the clear mode to the spread mode prior to transitioning the primary link from the clear mode to the spread mode.

3. The method of claim 1, further comprising: performing a rapid reacquisition at the secondary platform to reacquire the primary link in the spread mode after the transitioning.

4. The method of claim 1, wherein:
the secondary Doppler pre-compensation component compensates for movement of the secondary platform relative to a stationary position; and
the primary Doppler pre-compensation component compensates for movement of the primary platform relative to a stationary position.

5. The method of claim 1, wherein:
adjusting the primary transmission delta phase by the difference between the secondary reception delta phase and the primary transmission delta phase at the primary platform comprises: accounting for differences between a primary chip rate of the primary link and a secondary chip rate of the secondary link; and
adjusting the primary reception delta phase to be equal to the secondary transmission delta phase at the secondary platform comprises: accounting for differences between the primary chip rate of the primary link and the secondary chip rate of the secondary link.

6. The method of claim 1, wherein the difference between the secondary reception delta phase and the primary transmission delta phase at the primary platform comprises accumulated clock drift between the primary platform and the secondary platform.

7. The method of claim 1, wherein:
the secondary transmit phase is equal to a sum of the secondary transmit delta phase plus a product of a secondary platform time and a secondary chip rate;
the primary receive phase is equal to a sum of the primary receive delta phase plus a product of the secondary platform time and a primary chip rate;
the primary transmit phase is equal to a sum of the primary transmit delta phase plus a product of a primary platform time and the primary chip rate; and
the secondary receive phase is equal to a sum of the secondary receive delta phase plus a product of the primary platform time and the secondary chip rate.

8. The method of claim 7, wherein:
adjusting the primary transmission delta phase by the difference between the secondary reception delta phase and the primary transmission delta phase at the primary platform comprises: forming the difference by subtracting the primary transmission delta phase from the product of the secondary reception delta phase and the ratio of the primary chip rate to the secondary chip rate, wherein the secondary reception delta phase is in units of secondary chips and the primary transmission delta phase is in units of primary chips; and
adjusting the primary reception delta phase to be equal to the secondary transmission delta phase comprises: setting the primary reception delta phase equal to the secondary transmission delta phase multiplied by the ratio of the primary chip rate to the secondary chip rate, wherein the primary reception delta phase is in units of primary chips and the secondary transmission delta phase is in units of secondary chips.

9. The method of claim 8, wherein adjusting the primary transmission delta phase by the difference between the secondary reception delta phase and the primary transmission delta phase at the primary platform comprises: adding twice the range between the primary platform and the secondary platform, wherein the range is in units of primary chips.

10. A secondary platform for achieving synchronization with a primary link transmitted from a primary platform to the secondary platform, wherein the primary link can transition between a spread mode and a clear mode, the secondary platform comprising:

a modulator configured to transmit a secondary link spread spectrum signal using a secondary pseudonoise stream;

a secondary spreading code generator coupled to the modulator, wherein the secondary spreading code generator generates the secondary pseudonoise stream using a secondary transmit code phase;

a secondary transmit code phase accumulator coupled to the secondary spreading code generator, wherein the secondary transmit code phase accumulator advances the secondary code transmit code phase at a secondary chip rate plus an adjustment by a secondary transmit delta phase, wherein the secondary transmit delta phase comprises a Doppler pre-compensation for movement of the secondary platform;

a correlator configured to despread the primary link using a primary pseudonoise stream;

a primary spreading code generator coupled to the correlator, wherein the primary spreading code generator generates the primary pseudonoise stream using a primary receive code phase;

a primary receive code phase accumulator coupled to the primary receive spreading code generator, wherein the primary receive code phase accumulator advances the primary receive code phase at a primary chip rate plus an adjustment by a primary receive delta phase, wherein:
when receiving the primary link in spread mode, the primary receive delta phase is adjusted using a peak correlation time determined by the correlator; and
when transitioning the primary link from the clear mode to the spread mode, the primary receive delta phase is set equal to the secondary transmit delta phase.

11. The secondary platform of claim 10, wherein: when transitioning the primary link from the clear mode to the spread mode, the primary receive delta phase is set equal to the product of the secondary transmit delta phase and the ratio of the primary chip rate to the secondary chip rate, wherein the primary receive delta phase is units of primary chips and the secondary transmit delta phase is in units of secondary chips.

12. The secondary platform of claim 10, further comprising: a searcher configured to search for the primary link over a set of primary receive delta phase values, wherein the set covers a Doppler uncertainty.

13. The secondary platform of claim 10, further comprising: a receiver configured to receive a command on the primary link indicating a transition from the clear mode to the spread mode.

14. A primary platform for achieving synchronization with a secondary platform, where a primary link is transmitted from the primary platform to the secondary platform, the primary platform comprising:
a modulator configured to transmit the primary link signal, wherein the modulator can selectably transition between a spread mode wherein the primary link is spread using a primary pseudonoise stream and a clear mode wherein the primary link is unspread;
a primary spreading code generator coupled to the modulator to provide the primary pseudonoise stream using a primary transmit code phase;
a primary transmit code phase accumulator coupled to the primary spreading code generator, wherein the primary transmit code phase advances at a primary chip rate plus an adjustment by a primary transmit delta phase, wherein the primary transmit delta phase comprises a Doppler pre-compensation for movement of the primary platform;
a correlator configured to despread the secondary link using a secondary pseudonoise stream;
a secondary spreading code generator coupled to the correlator, wherein the secondary receive pseudonoise sequence generator generates the secondary pseudonoise stream using a secondary receive code phase;
a secondary receive code phase accumulator, wherein the secondary receive code phase accumulator advances the secondary receive code phase at a secondary chip rate plus an adjustment by a secondary receive delta phase, wherein the secondary receive delta phase is adjusted using a peak correlation time determined by the correlator; and
wherein the primary transmit code phase accumulator adjusts the primary transmit code phase by the difference between the primary transmit delta phase and the secondary receive delta phase when the primary link transitions from the clear mode to the spread mode.

15. The primary platform of claim 14, wherein: when transitioning the primary link from the clear mode to the spread mode, the primary transmit code phase is adjusted by the difference formed by subtracting the primary transmission delta phase from the product of the secondary reception delta phase and the ratio of the primary chip rate to the secondary chip rate, wherein the secondary reception delta phase is in units of secondary chips and the primary transmission delta phase is in units of primary chips.

16. The primary platform of claim 15, wherein: when transitioning the primary link from the clear mode to the spread mode, the primary transmit code phase is also adjusted by twice the range between the primary platform and the secondary platform, wherein the range is in units of primary chips.

17. The primary platform of claim 14, further comprising: a transmitter configured to transmit a command on the primary link indicating a transition from the clear mode to the spread mode.

* * * * *